(12) United States Patent
Meerbeek et al.

(10) Patent No.: US 11,234,312 B2
(45) Date of Patent: Jan. 25, 2022

(54) METHOD AND CONTROLLER FOR CONTROLLING A PLURALITY OF LIGHTING DEVICES

(71) Applicant: SIGNIFY HOLDING B.V., Eindhoven (NL)

(72) Inventors: Berent Willem Meerbeek, Veldhoven (NL); Dirk Valentinus René Engelen, Heusden-Zolder (BE); Anthonie Hendrik Bergman, Nuenen (NL); Bartel Marinus Van De Sluis, Eindhoven (NL); Tim Dekker, Eindhoven (NL); Jochen Renaat Van Gheluwe, Lommel (BE)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/756,685

(22) PCT Filed: Oct. 8, 2018

(86) PCT No.: PCT/EP2018/077326
§ 371 (c)(1),
(2) Date: Apr. 16, 2020

(87) PCT Pub. No.: WO2019/076667
PCT Pub. Date: Apr. 25, 2019

(65) Prior Publication Data
US 2020/0245435 A1 Jul. 30, 2020

(30) Foreign Application Priority Data
Oct. 16, 2017 (EP) ..................................... 17196631

(51) Int. Cl.
*H05B 47/105* (2020.01)
*H05B 45/10* (2020.01)
(Continued)

(52) U.S. Cl.
CPC ......... *H05B 47/105* (2020.01); *H05B 47/175* (2020.01); *H05B 47/19* (2020.01)

(58) Field of Classification Search
CPC .... H05B 47/105; H05B 47/175; H05B 45/20; H05B 45/10; H05B 47/19
See application file for complete search history.

(56) References Cited

U.S. PATENT DOCUMENTS

2001/0056574 A1 12/2001 Richards
2008/0262718 A1* 10/2008 Farwell ................ G05D 1/0244
701/445
(Continued)

FOREIGN PATENT DOCUMENTS

CA        2798279 A1    6/2013
WO    2010061334 A1    6/2010
(Continued)

*Primary Examiner* — Minh D A

(57) ABSTRACT

A method of controlling a plurality of lighting devices is disclosed. The method comprises obtaining a 360 degree panoramic image, rendering the 360 degree panoramic image at least partially on an image rendering device, obtaining positions of the plurality of lighting devices relative to the image rendering device, mapping the 360 degree panoramic image onto the plurality of lighting devices based on the positions of the plurality of lighting devices, such that each lighting device is associated with a part of the 360 degree panoramic image, determining, for each lighting device, a light setting based on an image characteristic of the part of the 360 degree image, and controlling each lighting device according to the respective light setting.

20 Claims, 7 Drawing Sheets

(51) Int. Cl.
*H05B 47/175* (2020.01)
*H05B 47/19* (2020.01)

(56) References Cited

U.S. PATENT DOCUMENTS

| | | |
|---|---|---|
| 2010/0177247 A1 | 7/2010 | Sekulovski et al. |
| 2013/0002809 A1* | 1/2013 | Shimizu ................ G06T 3/0062 |
| | | 348/38 |
| 2016/0285416 A1* | 9/2016 | Tiwari .................... H02S 50/15 |
| 2017/0090848 A1 | 3/2017 | Tomita et al. |
| 2019/0124749 A1* | 4/2019 | Deixler ..................... G06T 7/73 |

FOREIGN PATENT DOCUMENTS

| | | |
|---|---|---|
| WO | 2017015507 A1 | 1/2017 |
| WO | 2017174412 A1 | 10/2017 |

\* cited by examiner

500

METHOD AND CONTROLLER FOR CONTROLLING A PLURALITY OF LIGHTING DEVICES

CROSS-REFERENCE TO PRIOR APPLICATIONS

This application is the U.S. National Phase application under 35 U.S.C. § 371 of International Application No. PCT/EP2018/077326, filed on Oct. 8, 2018, which claims the benefit of European Patent Application No. 17196631.0, filed on Oct. 16, 2017. These applications are hereby incorporated by reference herein.

FIELD OF THE INVENTION

The invention relates to a method of controlling a plurality of lighting devices. The invention further relates to a computer program product for executing the method. The invention further relates to a controller for controlling a plurality of lighting devices, and to a system comprising the controller and the plurality of lighting devices.

BACKGROUND

The number of connected lighting systems in home environments is increasing. These connected lighting systems comprise lighting devices which can be controlled individually, for example based on control signals received from a smartphone, a home automation system or a media device such as a television. These lighting devices may further be controlled based on content that is being rendered on a display.

International patent application WO 2010/061334 A1, for example, discloses controlling ambient light in a display system around a display device based on depth information of an image, for example by controlling ambient light behind the display device based on the color and intensity of the object or objects being far away from the viewer and by controlling ambient light in front of the display device based on the color and intensity of the object or objects being close to the viewer.

International patent application WO 2017/174412 A1 discloses controlling a plurality of luminaires of a lighting system by capturing with an imaging device an image of the luminaires, processing the image to determine a location of each of the luminaires relative to a predominant field of view of the user, and controlling the luminaires of the lighting system to emit illumination, based on their deter-mined locations relative to the predominant field of view of the user. The image may be a panoramic image. For example, the panoramic image be a 360° panoramic image. This can be used to capture the position and directionality of natural and artificial illumination sources, in order to give a more accurate and perceptually similar representation of a scene image, such as an image of a "sunset over the ocean". A user may then select that scene image to be rendered by the luminaire and at least two colors may be selected from the image. Respective locations of the at least two selected colors within that scene image are determined. Subsequently, locations of the selected colors within the scene image are compared with the relative locations of the luminaires and/or their illumination footprints within the physical space, such that for each of the locations in the scene image, a matching one of the luminaires is identified. The colors of the scene image are mapped to the luminaires based on the position of the luminaires relative to the user.

SUMMARY OF THE INVENTION

The inventors have realized that in existing systems, such as the system of WO 2010/061334 A1 and WO 2017/174412 A1, wherein lighting devices are controlled based on image content displayed on a display device, the lighting control is limited to what is visible on the display device. If, for example, the display device displays a video of a sunset at the beach, the lighting devices surrounding the viewer will be controlled based on this information. A lighting device behind the display device may be controlled according to a light setting resembling the setting sun, and a lighting device in front of the display device may be controlled according to the color of the sand in the image. The inventors have realized that, in order to further immerse the viewer in the image content, it would be desirable if the lighting devices do not only represent image characteristics that are being displayed, but also additional image characteristics, such as, referring to the previous example, a boulevard parallel to the beach.

It is therefore an object of the present invention to create a more immersive user experience for a video display system.

According to a first aspect of the present invention, the object is achieved by a method of controlling a plurality of lighting devices, the method comprising:

obtaining a 360 degree panoramic image, rendering the 360 degree panoramic image at least partially on an image rendering device, obtaining positions of the plurality of lighting devices relative to the image rendering device, mapping the 360 degree panoramic image onto the plurality of lighting devices based on the positions of the plurality of lighting devices, such that each lighting device is associated with a part of the 360 degree panoramic image, determining, for each lighting device, a light setting based on an image characteristic of the part of the 360 degree image, and controlling each lighting device according to the respective light setting.

By controlling a plurality of lighting devices based on image characteristics (such as colors) of a 360 degree panoramic image, content that is not directly visible on the image rendering device (e.g. a display) is perceivable via the lighting devices. Thus, when a user is watching a 360 degree video of a sunset at the beach, the sunset will be displayed on the display. Additional video content comprised in the 360 degree video, such as a boulevard parallel to the beach, may not be rendered on the display, but lighting devices surrounding the user may be controlled based on this content. This is beneficial, because it creates a more immersive user experience.

Another benefit of the present invention is that it enables a user to see/perceive what is occurring in the rest of the 360 degree panoramic image/video. If, for example, the user is watching a movie, and a part of a certain scene is being displayed on the display, for example two people having a conversation, fireworks may be exploding in a different part of the 360 degree panoramic video, for example behind the user. Even though the user cannot see the fireworks on the display, a lighting device behind the user may be controlled based on a part of the 360 degree panoramic video that comprises the fireworks. This enables a user to experience the fireworks, even though the firework explosions are not rendered on the display.

The image rendering device may be a portable device, and the method may further comprise: receiving an input indicative of a change of orientation of the image rendering device and maintaining the mapping of the 360 degree panoramic image onto the plurality of lighting devices. A user may, for example, rotate/reorient the portable device, whereupon a different part of the 360 degree panoramic image may be rendered on the image rendering device. The method may further comprise rendering a part of the 360 degree panoramic image as a function of the orientation of the portable device. This enables a user to view different parts of the 360 degree image content by changing the orientation of the portable device. By maintaining the mapping of the 360 degree panoramic image onto the plurality of lighting devices, the mapping does not change when a user reorients the portable device. For example, referring to the example wherein a user watches a movie scene wherein two people are having a conversation and fireworks are exploding behind the user, the user may rotate the portable device in order to see the fireworks on the display of the portable device. Since the mapping of the 360 degree panoramic image onto the plurality of lighting devices does not change, the lighting devices now in front of the user who is watching the fireworks on the portable device will still be controlled according to the firework explosions.

The method may further comprise: receiving an input indicative of a rotation of the 360 degree panoramic image relative to the image rendering device and adjusting the mapping of the 360 degree panoramic image onto the plurality of lighting devices in dependence on the rotation. The input may, for example, be generated by a remote control device, by a device that controls the image rendering device, etc. The input may be a user input, or the input may be generated by a computer program running on a computing device. It may be desirable to rotate the mapping, for example when a user wishes to see a different part of the 360 degree panoramic image on the image rendering device. Additionally or alternatively, the rotation may result in a better mapping of different image characteristics of the 360 degree panoramic image onto the lighting devices.

The method may further comprise: analyzing the 360 degree panoramic image to identify one or more dominant image characteristics and identifying, in the 360 degree panoramic image, positions of the one or more dominant image characteristics, and the mapping of the 360 degree panoramic image onto the plurality of lighting devices and the image rendering device may be further based on the positions of the one or more dominant image characteristics, wherein the positions of the one or more dominant image characteristics substantially correspond to the positions of one or more of the plurality of lighting devices (and/or the position of the image rendering device). By mapping the 360 degree panoramic image onto the plurality of lighting devices and the image rendering device based on one or more dominant image characteristics in the 360 degree panoramic image, the mapping is being optimized such that each dominant image characteristic is mapped onto a respective lighting device (and/or onto the image rendering device). This is beneficial, because each dominant image characteristic will be visible via the respective lighting device (and/or the image rendering device).

The method may further comprise analyzing the part of the 360 degree panoramic image to identify a dominant image characteristic in the part of the 360 degree panoramic image, and determining the light setting for a respective lighting device based on the dominant image characteristic. By determining a dominant image characteristic (e.g. a dominant color, a dominant object, etc.) in the part of the 360 degree panoramic image and by determining the light setting for the lighting device associated with that part of the 360 degree panoramic image, the lighting device is controlled based on the dominant image characteristic.

The method may further comprise receiving a user position of a user or a user device, and the mapping of the 360 degree panoramic image onto the plurality of lighting devices may be further based on the user position. It may be beneficial to map the 360 degree panoramic image based on the position of a user or a user device (operated by a user) in order to optimize the user experience of the 360 degree panoramic image/video watching experience. A user may, for example, be located in a first part of a space, and it may be esired that (only) lighting devices located in that first space are controlled based on the 360 degree panoramic image.

The method may further comprise receiving a user orientation of a user or a user device, and the mapping of the 360 degree panoramic image onto the plurality of lighting devices may be further based on the user orientation. In order to determine an initial mapping of the 360 degree panoramic image onto the plurality of lighting devices, an (initial) orientation of the user or the user device may be determined, and the mapping of the 360 degree panoramic image onto the plurality of lighting devices may be based thereon.

The method may further comprise receiving capability information of each of the plurality of lighting devices, which capability information is indicative of at least one of:

a color rendering capability of the respective lighting device, and a number and/or a distribution of light sources of the lighting device, and the mapping of the 360 degree panoramic image onto the plurality of lighting devices may be further based on the capability information. The capability information may, for example, relate to a type of lighting device and its number and/or a distribution of light sources. A first lighting device may, for example, be an LED strip, and a second device may, for example, be a spot lighting device. The 360 degree panoramic image, for example an image of a sky with a sun, may be mapped onto the plurality of lighting devices such that the sun is mapped onto the spot lighting device, and the sky is mapped onto the LED strip. This further optimizes the mapping of the 360 degree panoramic image, and therewith the experience of watching the 360 degree panoramic image/video.

The 360 degree panoramic image may comprise depth information, and the mapping of the 360 degree panoramic image onto the plurality of lighting devices may be further based on the depth information. The 360 degree panoramic image may, for example, comprise a depth map comprising information relating to the distance of objects in the image relative to the 360 degree panoramic image. A certain object present in the 360 degree panoramic image may be mapped onto a lighting device that is located at a distance from the 360 degree panoramic image that corresponds to the distance of the object relative to the 360 degree panoramic image. This further optimizes the mapping of the 360 degree panoramic image, and therewith the experience of watching the 360 degree panoramic image/video.

The method may further comprise obtaining one or more positions of one or more further image rendering devices, and the mapping of the 360 degree panoramic image onto the plurality of lighting devices is further based on the one or more positions of one or more further image rendering devices. Additionally, a second part of the 360 degree panoramic image, which is located at a position in the 360 degree panoramic image that corresponds to a position of a further image rendering device, may be rendered on the further image rendering device. Thus, additional to mapping the 360 degree panoramic image onto the plurality of lighting devices, the 360 degree panoramic image may be mapped onto further image rendering devices.

The 360 degree panoramic image may be a 360 degree panoramic video, and the light setting may be based on a video characteristic of the part of the 360 degree image. The 360 degree panoramic video is a sequence of 360 degree panoramic images. The plurality of lighting devices may be controlled according to the sequence of 360 degree panoramic images over time, such that the light output of the plurality of lighting devices corresponds to the 360 degree panoramic video.

According to a second aspect of the present invention, the object is achieved by a computer program product for a computing device, the computer program product comprising computer program code to perform the method of any one of the above-mentioned methods when the computer program product is run on a processing unit of the computing device.

According to a third aspect of the present invention, the object is achieved by a controller for controlling a plurality of lighting devices, the controller comprising:

a communication unit configured to communicate with the plurality of lighting devices, and a processor configured to obtain a 360 degree panoramic image being at least partially rendered on an image rendering device, obtain positions of the plurality of lighting devices relative to the image rendering device, map the 360 degree panoramic image onto the plurality of lighting devices based on the positions of the plurality of lighting devices, such that each lighting device is associated with a part of the 360 degree panoramic image, determine, for each lighting device, a light setting based on an image characteristic of the part of the 360 degree image, and to control, via the communication unit, each lighting device according to the respective light setting.

According to a fourth aspect of the present invention, the object is achieved by a lighting system comprising the controller, and a plurality of lighting devices, each comprising a receiver configured to receive lighting control commands from the controller.

It should be understood that the claimed computer program product, controller and lighting system may have similar and/or identical embodiments and advantages as the claimed method.

In the context of the present invention, the term "image characteristic" or "video characteristic" relates to an identifiable characteristic of an image or a video. The characteristic may for example be a color, a dominant color, an average color, an object such as a device, infrastructure, a plant, an animal or a person, an event such as a fire, fireworks an explosion, a sunrise, a natural phenomenon such as a rainbow or the northern lights, etc.

BRIEF DESCRIPTION OF THE DRAWINGS

The above, as well as additional objects, image characteristics and advantages of the disclosed systems, devices and methods will be better understood through the following illustrative and non-limiting detailed description of embodiments of devices and methods, with reference to the appended drawings, in which:

FIG. 3b shows a top view of the system of FIG. 3a;

FIG. 4b shows a top view of the system of FIG. 4a;

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
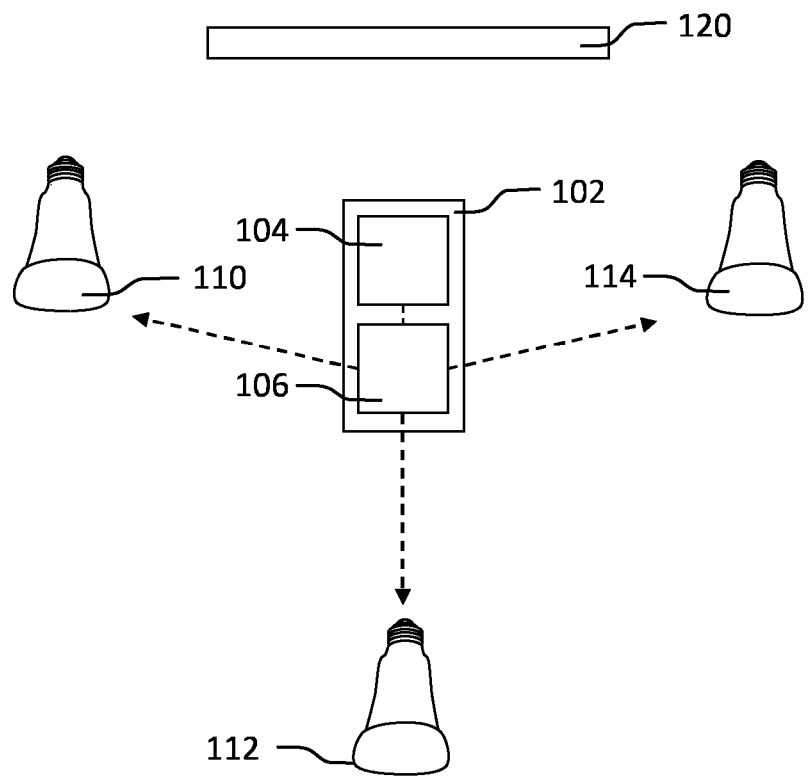
FIG. 1 shows schematically an embodiment of a system for controlling a plurality of lighting devices.

FIG. 1 shows schematically an embodiment of a system 100 for controlling a plurality of lighting devices 110, 112, 114. The system 100 comprises an image rendering device 120 (e.g. a display, a projector, etc.) and a controller 102, comprising a communication unit 106 for controlling the plurality of lighting devices 110, 112, 114. The controller 102 may control the plurality of lighting devices 110, 112, 114 by communicating lighting control commands to the plurality of lighting devices 110, 112, 114. The lighting control commands may comprise control instruction to control each of the plurality of lighting devices 110, 112, 114 according to a light setting (e.g. light with a certain color, brightness and saturation). The controller 102 may be further configured to communicate with the image rendering device 120. The communication unit 106 may be configured to communicate with the lighting devices 110, 112, 114 (and, optionally, the image rendering device 120) directly or indirectly, via any suitable wired or wireless communication protocol, for example via Ethernet, DMX, DALI, USB, Bluetooth, Wi-Fi, Li-Fi, 3G, 4G or ZigBee.

The controller 102 further comprises a processor 104 (e.g. a microchip, circuitry, a microcontroller, etc.) configured to obtain a 360 degree panoramic image being at least partially rendered on the image rendering device 120, to obtain positions of the plurality of lighting devices 110, 112, 114 relative to the image rendering device 120, map the 360 degree panoramic image onto the plurality of lighting devices 110, 112, 114 based on the positions of the plurality of lighting devices 110, 112, 114, such that each lighting device is associated with a part of the 360 degree panoramic image. The processor 104 is further configured to determine, for each lighting device, a light setting based on an image characteristic of the part of the 360 degree image, and to control, via the communication unit 106, each lighting device according to the respective light setting.

The processor 104 is configured to obtain a 360 degree panoramic image. The 360 degree panoramic image may be received from different sources, for example from a media player coupled to the image rendering device 120, from a computer program such as a game, from video streaming software, etc. The 360 degree panoramic image is at least partially rendered on the image rendering device 120. The controller 102 may be configured to render a part of the 360 degree panoramic image on the image rendering device 120. Alternatively, a further device connected to the image rendering device 120 may be configured to render the at least part of the 360 degree panoramic image on the image rendering device 120 and to communicate the 360 degree panoramic image (or a stream of 360 degree panoramic images) to the controller 102.

The processor 104 is further configured to obtain two-dimensional or three-dimensional positions of the plurality of lighting devices 110, 112, 114 relative to the image rendering device 120. The processor 104 may be configured to receive position information of the plurality of lighting device 110, 112, 114, for example from the lighting devices, from an indoor positioning system, from a central control system, such as a home automation system, etc. The position information may comprise, for example, a set of coordinates of a respective lighting device (e.g. x, y, z coordinates) relative to a space, or the position information may be descriptive of a position of a respective lighting device (e.g. front left, front right, rear left, rear right, center, etc.). Similarly, the processor 104 may be configured to receive position information of the image rendering device 120 relative to the space.

The processor 104 is further configured to map the 360 degree panoramic image onto the plurality of lighting devices 110, 112, 114 based on the positions of the plurality of lighting devices 110, 112, 114, such that each lighting device is associated with a part of the 360 degree panoramic image. This is further explained in FIGS. 2-6, which are described below. The processor may determine a (virtual) position and size of the 360 degree panoramic image based on the positions of the plurality of lighting devices 110, 112, 114. The processor 104 may be configured to scale the 360 degree panoramic image based on the positions of the plurality of lighting devices 110, 112, 114. For example, the processor 104 may increase the range of the 360 degree panoramic image when the lighting devices are positioned further apart from the image rendering device 120. Additionally, the processor 104 may be configured to map the 360 degree panoramic image onto the physical space. The processor 104 may, for example, receive information about the dimensions of the physical space and the positions of the lighting devices therein. After the mapping, the processor 104 may associate each of the lighting devices with a part of the 360 degree panoramic image. The processor 104 may determine an initial mapping of the 360 degree panoramic image based on the positions of the plurality of lighting devices 110, 112, 114 and/or based on a position of the image rendering device 120. The processor 104 may be further configured to adjust the initial mapping based on one or more parameters, such as the position of a user, the orientation of a user, the position of a dominant feature in the 360 degree panoramic image, etc. Examples of adjustments of the initial mapping are further described below.

Figure 2:
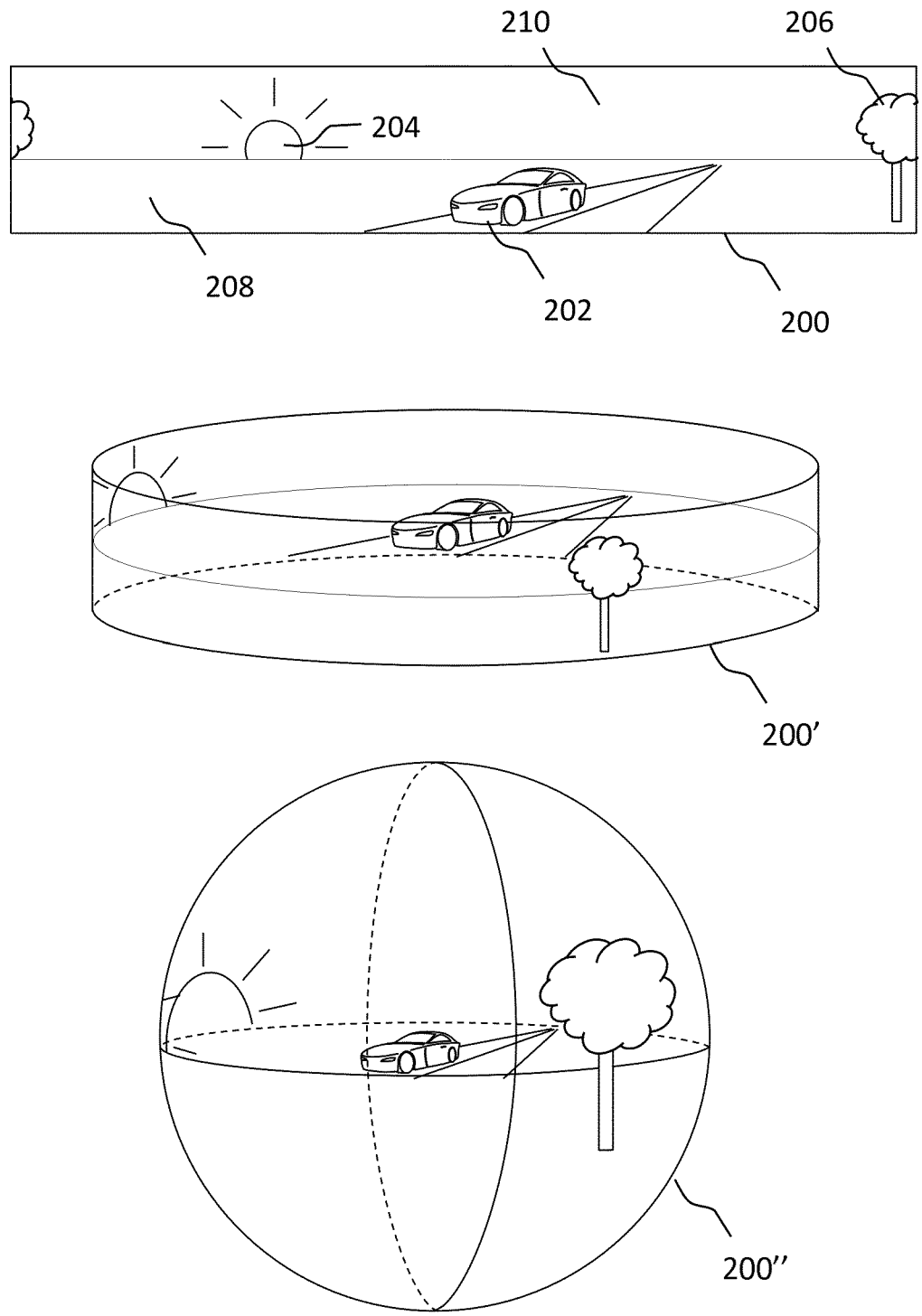
FIG. 2 shows schematically examples of a 360 degree panoramic image.

FIG. 2 shows schematically examples of a 360 degree panoramic image. The 360 degree panoramic image may, for example, be a cylindrical panoramic image 200' or a spherical panoramic image 200". The top image 200 in FIG. 2 shows an unfolded version of the cylindrical panoramic image 200' or the spherical image 200". The 360 degree panoramic images in FIG. 2 show an image of a vehicle 202, a sun 204, a tree 206, grass 208 and a sky 210.

The processor 104 is further configured to determine, for each lighting device, a light setting based on an image characteristic of the part of the 360 degree panoramic image. The image characteristic (or in some embodiments video characteristic) relates to an identifiable characteristic of the 360 degree panoramic image (or a video). The characteristic may for example be a color, a dominant color, an average color, an object such as a device, infrastructure, a plant, an animal or a person, an event such as a fire, an explosion, a sunrise, etc.

The parts of the 360 degree panoramic image that are associated with the lighting devices may be predefined, or the processor 104 may be configured to determine the parts, for example by using known image analysis techniques to identify the characteristics. The processor may, for example, divide the 360 degree panoramic image in multiple parts and associate at least some of the parts with lighting devices. The 360 degree panoramic image may be divided into equal parts, or be divided into parts based on characteristics of the 360 degree panoramic image. Referring to FIG. 2, the image may, for example, be divided in 5 parts based on the characteristics of the image 200: a first part comprising the car 202, a second part comprising the sun 204, a third part comprising the tree 206, a fourth part comprising the grass 208 and a fifth part comprising the sky 210. After the creation of the parts of the 360 degree panoramic image, the processor 104 may associate at least some of the parts with lighting devices. The first part comprising the car 202 may for example be associated with a first lighting device, the second part comprising the sun 204 with a second lighting device, the third part comprising the tree 206 with a third lighting device, the fourth part comprising the grass 208 with one or more fourth lighting devices located on floor level and the fifth part comprising the sky 210 with one or more fifth lighting devices located on ceiling level.

The processor 104 may be configured to extract light settings for each lighting device based on the part of the 360 degree panoramic image that is associated with that lighting device. The processor 104 may, for example, extract a color from the part of the 360 degree panoramic image by determining a dominant or average color in the part of the 360 degree panoramic image, and generate a light setting based on that color. Additionally or alternatively, the processor 104 may recognize an object in the part of the 360 degree panoramic image by using known image analysis techniques, and generate a light setting based on that a color of the object.

The processor 104 may be further configured to analyze the 360 degree panoramic image to identify one or more dominant image characteristics, and identify, in the 360 degree panoramic image, positions of the one or more dominant image characteristics, and map the 360 degree panoramic image onto the plurality of lighting devices and the image rendering device based on the positions of the one or more dominant image characteristics, wherein the positions of the one or more dominant image characteristics substantially correspond to the positions of one or more of the plurality of lighting devices (and/or the position of the image rendering device). The processor 104 may, for example, calculate a plurality of different mappings of the 360 degree panoramic image onto the plurality of lighting devices 112, 114, 114 (and the image rendering device 102), determine for each mapping a number of matches between lighting devices (and the image rendering device) and dominant image characteristics, and select a mapping form the plurality of different mappings based on the number of matches of the mappings, for example by selecting a mapping which has a number of matches above a threshold value, or by selecting a mapping which has the highest number of matches.

Figure 3A:
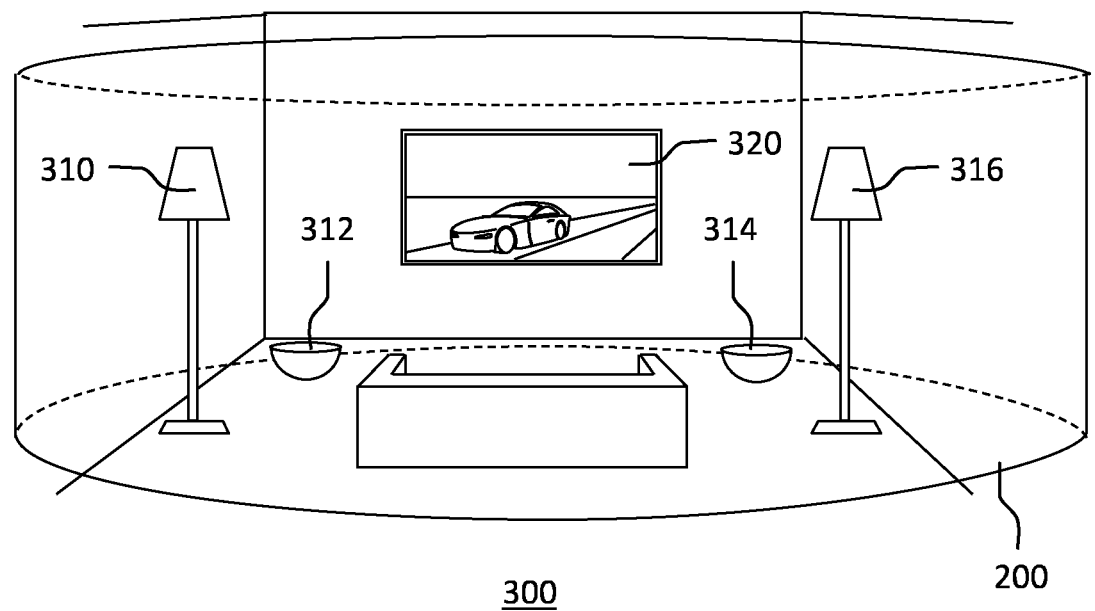
FIG. 3a shows an example of a system for controlling a plurality of lighting devices and a display device based on a mapping of the 360 degree panoramic image of FIG. 2.
Figure 3B:
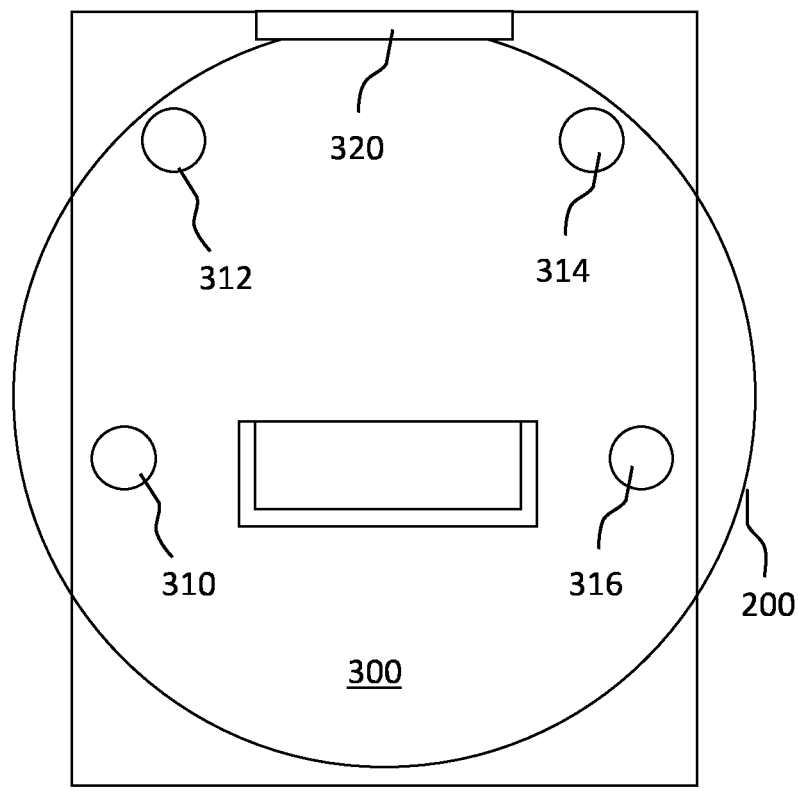

FIGS. 3a and 3b show an example of a system 300 for controlling a plurality of lighting devices 310, 312, 314, 316 and a display 320 based on a mapping of the image 200. The processor (not shown) of the controller (not shown) may obtain the positions of the lighting devices 310, 312, 314, 316 relative to the display 320 and map the image 200 onto the lighting devices 310, 312, 314, 316 based on the positions of the lighting devices 310, 312, 314, 316 (and, optionally, based on the position of the display 320). The processor may further associate a part of the image 200 with each of the lighting devices 310, 312, 314, 316 (and, in embodiments wherein the processor is further configured to map the image 200 onto the display 320, associate a part of the image 200 with the display 320). In the example of FIG. 3a, the vehicle 202 may be rendered on the display 320. Based on the mapping of the image 200 onto the lighting devices 310, 312, 314, 316, a first part of the image 200 comprising the sun 204 may be associated with lighting device 310, and a second part of the image 200 comprising the tree 206 may be associated with lighting device 316. A third and fourth part of the image 200 (for example the grass 208 in between the vehicle 202 and the sun 204, and the grass 208 in between the vehicle 202 and the tree 206, respectively) may be associated with lighting devices 312 and 314, respectively. Based on the association between the parts of the images and the lighting devices, the processor may determine light settings for these lighting devices. The processor may determine a first light setting (for example a bright yellow light setting resembling the sun 204) for lighting device 310 based on the first part of the image 200, determine a second light setting (for example a dark green light setting resembling the tree 206) for lighting device 316 based on the second part of the image 200 and determine a third and fourth light setting (for example a light green light setting resembling the grass 208) for lighting devices 312 and 314 based on the third and fourth parts of the image 200. The processor may then control the lighting devices 310, 312, 314, 316 according to these light settings.

In the example of FIGS. 3a and 3b, the processor has mapped the 360 degree panoramic image onto the lighting devices such that the positions of the image rendering device and the lighting devices determine position and the outer perimeter of the 360 degree panoramic image. In other words, the 360 degree panoramic image is mapped such that the image rendering device is positioned at an outer perimeter of the 360 degree panoramic image. Alternatively, as illustrated in the system 400 of FIGS. 4a and 4b, the processor may map the 360 degree panoramic image onto the lighting devices such that the positions of the image rendering devices create the outer perimeter of the 360 degree panoramic image. The position of the image rendering device may, for example, be used to determine the center point/point of origin of the 360 degree panoramic image relative to the plurality of lighting devices.

The image rendering device 120 may be comprised in a portable device (e.g. a smartphone, a tablet pc, a wearable device such as smartglasses or a smartwatch, etc.). The controller 102 may be further comprised in the portable device. The processor 104 may be further configured to receive an input indicative of a change of orientation of the image rendering device 120/portable device, and maintain the (initial) mapping of the 360 degree panoramic image onto the plurality of lighting devices 110, 112, 114. A user may, for example, rotate/reorient the portable device, whereupon a different part of the 360 degree panoramic image may be rendered on the image rendering device 120. The processor 104 may render a part of the 360 degree panoramic image as a function of the orientation of the portable device. This enables a user to view different parts of the 360 degree image content by changing the orientation of the portable device. By maintaining the mapping of the 360 degree panoramic image onto the plurality of lighting devices 110, 112, 114, the mapping does not change when a user reorients the portable device.

Figure 4A:
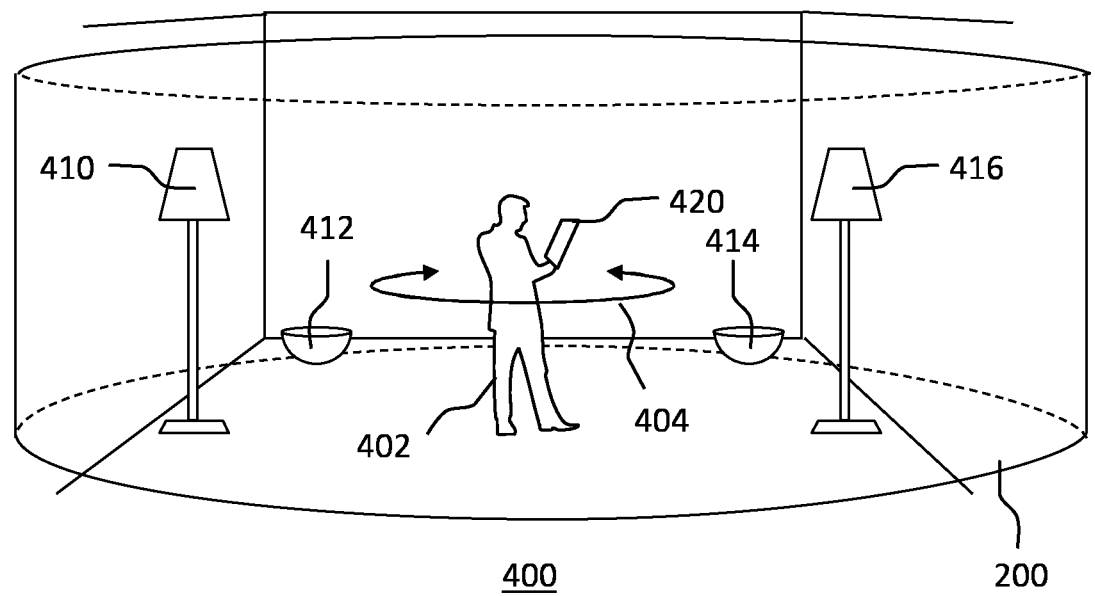
FIG. 4a shows an example of a system for controlling a plurality of lighting devices and a display of a portable device based on a mapping of the 360 degree panoramic image of FIG. 2.
Figure 4B:
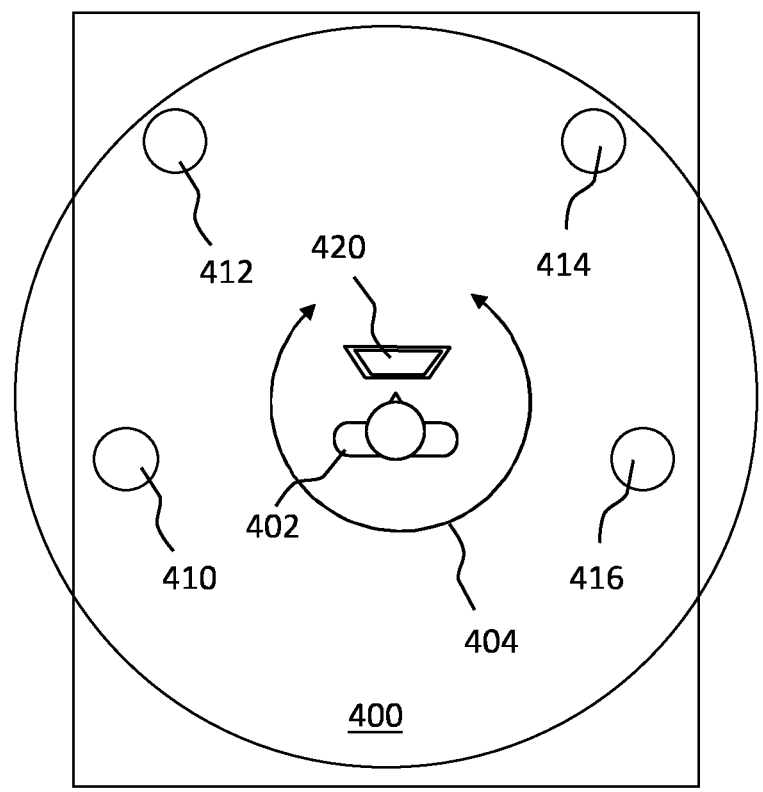

FIGS. 4a and 4b show an example of a system 400 for controlling a plurality of lighting devices 410, 412, 414, 416 and a display 420 based on a mapping of the image 200. The processor (not shown) of the controller (not shown) may obtain the positions of the lighting devices 410, 412, 414, 416 relative to the display 420 and map the image 200 onto the lighting devices 410, 412, 414, 416 based on the positions of the lighting devices 410, 412, 414, 416 (and, optionally, based on the position and the orientation of the display 420). In the example of FIGS. 4a and 4b, the display 420 is comprised in a portable device carried by a user 402. The processor may further associate a part of the image 200 with each of the lighting devices 410, 412, 414, 416 (and, in embodiments wherein the processor is further configured to map the image 200 onto the display 420, associate a part of the image 200 with the display 420). In the example of FIG. 4a, the vehicle 202 may be rendered on the display 420. Based on the mapping of the image 200 onto the lighting devices 410, 412, 414, 416, a first part of the image 200 comprising the sun 204 may be associated with lighting device 410, and a second part of the image 200 comprising the tree 206 may be associated with lighting device 416. A third and fourth part of the image 200 (for example the grass 208 in between the vehicle 202 and the sun 204, and the grass 208 in between the vehicle 202 and the tree 206, respectively) may be associated with lighting devices 412 and 414, respectively. Based on the association between the parts of the images and the lighting devices, the processor may determine light settings for these lighting devices. The processor may determine a first light setting (for example a bright yellow light setting resembling the sun 204) for lighting device 410 based on the first part of the image 200, determine a second light setting (for example a dark green light setting resembling the tree 206) for lighting device 416 based on the second part of the image 200 and determine a third and fourth light setting (for example a light green light setting resembling the grass 208) for lighting devices 412 and 414 based on the third and fourth parts of the image 200. The processor may then control the lighting devices 410, 412, 414, 416 according to these light settings.

The user 402 may reorient 404 the portable device (and therewith the display 420). The processor may maintain the mapping of the image 200 onto the plurality of lighting devices 410, 412, 414, 416. The processor may further a part of the 360 degree panoramic image as a function of the orientation of the portable device. The user may, for example, rotate 404 the portable device (and therewith the display 420) towards lighting device 410, whereupon the processor may render the sun 204 of the image 200 onto the display 420. Since the mapping of the image onto the plurality of lighting devices 410, 412, 414, 416 has not changed, the lighting devices 410, 412, 414, 416 are still controlled based on their initial mapping. Thus, lighting device 416 will still emit dark green light resembling the tree 206, even though the tree 206 is also rendered on the display 420.

The processor 104 may be further configured to receive an input indicative of a rotation of the 360 degree panoramic image relative to the image rendering device 120. The processor 104 may be further configured to adjust the mapping of the 360 degree panoramic image onto the plurality of lighting devices 110, 112, 114 in dependence on the rotation. The input may, for example, be generated by a remote control device, a rotary knob, or a remote control object comprising an orientation sensor, or a smartphone. Additionally or alternatively, the input may be generated by a device that controls the image rendering device 120. The input may be a user input, or the input may be generated by a computer program running on a computing device, for example by game software, wherein the rotation is a game-play element of the game. It may be desirable to rotate the mapping, for example because a user wishes to see a different part of the 360 degree panoramic image on the image rendering device 120. Beneficially, the rotation may result in a better mapping of different image characteristics of the 360 degree panoramic image onto the lighting devices 110, 112, 114. Referring to FIG. 3, a user may provide an input to rotate the image 200 relative to the display 320. As a result, the processor may adjust the mapping of the image onto the plurality of lighting devices 310, 312, 314, 316. The user may, for example, rotate the image 200 counterclockwise. As a result, the tree 206 may be rendered on the display 320, and lighting device 310 may be controlled according to a color of the vehicle 202, lighting device 316 may be controlled according to the bright yellow color associated with the sun 204 and lighting devices 312 and 314 may (still) be controlled according to the light green light setting resembling the grass 208.

The processor 104 may be further configured to analyze the 360 degree panoramic image to identify one or more dominant image characteristics, and, upon receiving the input indicative of the rotation of the 360 degree panoramic image, map the 360 degree panoramic image onto the image rendering device 120 and the plurality of lighting devices 110, 112, 114 such that one of the one or more dominant image characteristics is rendered on the image rendering device 120. As a result, the 360 degree panoramic image 'snaps' to the image rendering device 120. Additionally or alternatively, the processor 104 may be configured to map the 360 degree panoramic image onto the image rendering device 120 and the plurality of lighting devices 110, 112, 114 such that one of the one or more dominant image characteristics is rendered on a lighting device. As a result, the 360 degree panoramic image 'snaps' to that lighting device when it is being rotated relative to the plurality of lighting devices 110, 112, 114. This ensures that dominant image characteristics are continuously visible, and will not be 'lost' in between the lighting devices 110, 112, 114 and the image rendering device(s) 120. In other words, during the rotation of the 360 degree panoramic image, a dominant image characteristics may only move to a next lighting device/image rendering device if a proper match between a dominant image characteristic and a next lighting device/image rendering device has been found. This means that dominant image characteristics remain 'magnetically snapped' to matching lighting devices/image rendering device(s) until the rotation change has reached a point whereby in the mapping the dominant image characteristic has come close enough to transition to a next lighting device/image rendering device. The transition from a first light setting to a second light setting may occur instantly or gradually (e.g. a smooth/fading transition of the first light setting to the second light setting).

The processor 104 may be further configured to receive a user position of a user or a user device, and map the 360 degree panoramic image onto the plurality of lighting devices based on the user position. The processor 104 may determine an initial mapping of the 360 degree panoramic image based on an initial position of the user. The position of the user or the user device (such as a smartphone, smartglasses, etc.) may be obtained from an (indoor) positioning system or from the user device. The processor 104 may be configured to map the 360 degree panoramic image (only) onto lighting devices located within a (predefined) proximity of the image rendering device 120 (or within a (predefined) proximity of the user or the user device). A user may, for example, be located in a first area of a space comprising the lighting system 100. The processor 104 may therefore map the 360 degree panoramic image onto lighting devices that are located in the first area. If the user would move to a second area of the space, the processor 104 may map the 360 degree panoramic image onto lighting devices located in the second area. In another example, a user may be positioned close to the image rendering device 120 (e.g. a television). The processor 104 may be configured to map the 360 degree panoramic image (only) onto lighting devices located within a (predefined) proximity of the image rendering device 120 (or within a (predefined) proximity of the user).

The processor 104 may be further configured to receive a user orientation of a user or a user device, and map the 360 degree panoramic image onto the plurality of lighting devices based on the user orientation. The processor 104 may determine an initial mapping of the 360 degree panoramic image based on an initial orientation of the user. The orientation of the user or the user device (such as a smartphone, smartglasses, etc.) may be obtained from an (indoor) positioning system or from the user device. The processor 104 may for example be configured to map the 360 degree panoramic image (only) onto lighting devices located within the field of view of the user. Additionally or alternatively, when the user orientation changes, the processor 104 may rotate the mapping of the 360 degree panoramic image accordingly.

The processor 104 may be further configured to receive capability information of each of the plurality of lighting devices 110, 112, 114 via the communication unit 106. The capability information of a lighting device may be indicative of a color rendering capability of that lighting device, a number and/or a distribution of light sources of the lighting device, etc. The processor 104 may be further configured to map the 360 degree panoramic image onto the plurality of lighting devices 110, 112, 114 based on the capability information. The processor 104 may, for example, analyze the 360 degree panoramic image to identify (dominant) image characteristics, calculate a plurality of different mappings of the 360 degree panoramic image onto the plurality of lighting devices 112, 114, 114 (and the image rendering device 102) by mapping the (dominant) image characteristics onto the lighting devices based on their capability information, determine for each mapping a number of matches between lighting devices (and the image rendering device 120) and image characteristics of the 360 degree panoramic image and select a mapping form the plurality of different mappings based on the number of matches of the mappings, for example by selecting a mapping which has a number of matches above a threshold value, or by selecting a mapping which has the highest number of matches. The processor 104 may, for example, receive capability information about two lighting devices of the lighting system 100. A first lighting device 110 may be a spotlight configured to emit white light positioned on ceiling level and a second lighting device 112 may be an LED strip configured to emit colored light positioned on ground level. The 360 degree panoramic image, for example an image of a sky with a sun, and the processor 104 may map it onto the two lighting devices such that the sun is mapped onto the spotlight, and the sky is mapped onto the LED strip.

Figure 5:
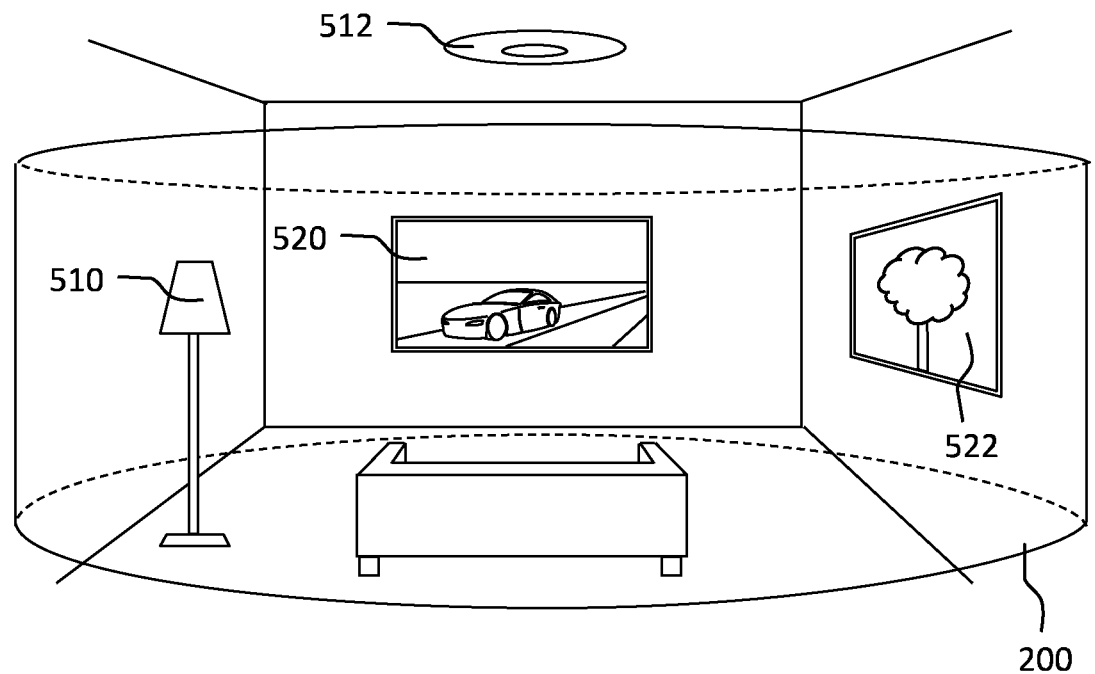
FIG. 5 shows an example of a system for controlling a plurality of lighting devices and a plurality of display devices based on a mapping of the 360 degree panoramic image of FIG. 2.

The system 100 may further comprise one or more further image rendering devices. The processor 104 may be further configured to obtain one or more positions of one or more further image rendering devices. The positions of the one or more further image rendering devices may for example be received from an (indoor) positioning system or from the further image rendering devices. The processor 104 may be further configured to map the 360 degree panoramic image onto the plurality of lighting devices further based on the one or more positions of one or more further image rendering devices. The processor 104 may, for example, analyze the 360 degree panoramic image to identify (dominant) image characteristics, calculate a plurality of different mappings of the 360 degree panoramic image onto the image rendering devices, determine for each mapping a number of matches between image rendering devices and image characteristics of the 360 degree panoramic image and select a mapping form the plurality of different mappings based on the number of matches of the mappings, for example by selecting a mapping which has a number of matches above a threshold value, or by selecting a mapping which has the highest number of matches. FIG. 5 illustrates an example of a system 500 wherein the image 200 has been mapped onto a plurality of image rendering devices 520, 522 (displays) and lighting devices 510, 512. A processor (not shown) may obtain positions of the displays 520, 522 and lighting devices 510, 512, analyze the image 200 to identify image characteristics (the vehicle 202, the sun 204, the tree 206, the grass 208 and the sky 210), calculate different mappings onto the displays 520, 522 and the lighting device 510 and select one of the mappings, for example a mapping wherein the vehicle 202 is mapped onto a first display 520, the tree 206 is mapped onto a second display 522, the sun 204 is mapped onto a first lighting device 510 and the sky is mapped onto a second lighting device 512. Based on this mapping, the displays 520, 522 and lighting devices 510, 512 are controlled accordingly.

The 360 degree panoramic image may comprise depth information, for example a depth map. The processor 104 may be further configured to map the 360 degree panoramic image onto the plurality of lighting devices 110, 112, 114 further based on the depth information. The 360 degree panoramic image may, for example, comprise a depth map comprising information relating to the distance of objects in the image relative to the 360 degree panoramic image. The processor 104 may, for example, determine a base distance from a reference point (e.g. a user, a user device, the display device, etc.) and determine a distance of an object in the 360 degree panoramic image relative to the base distance based on the depth information. The processor 104 may further compare the positions of the plurality of lighting devices 110, 112, 114 with the positions of the objects in the 360 degree panoramic image in order to determine how to map the 360 degree panoramic image onto the lighting devices, such that the positions of the lighting devices (substantially) correspond to the positions of the objects in the 360 degree panoramic (depth) image. The processor 104 may calculate different mappings, and select one of the mappings wherein the positions of the lighting devices (substantially) correspond to the positions of the objects in the 360 degree panoramic (depth) image.

Figure 6A:
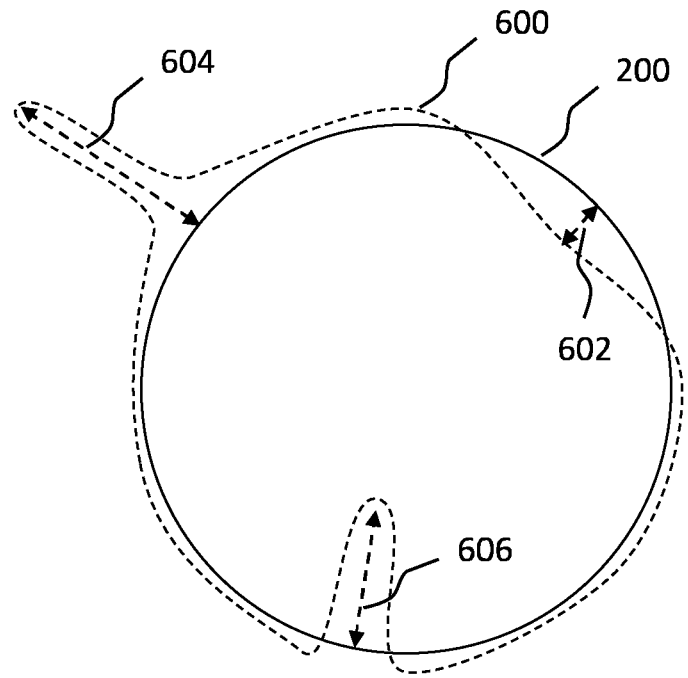
FIG. 6a shows an example of depth information of the 360 degree panoramic image of FIG. 2.
Figure 6B:
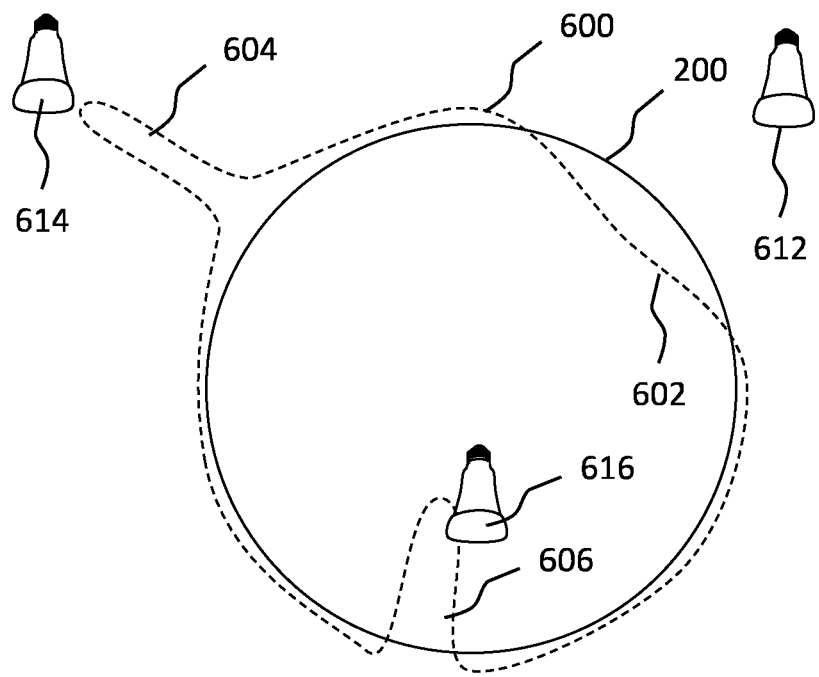
FIG. 6b shows an example of a mapping of the 360 degree panoramic image of FIG. 6a onto a plurality of lighting devices based on the depth information.

FIG. 6a illustrates an example of two-dimensional depth information 600 of the image 200. In this example, the vehicle 202 may have a distance 602 from the base 600, the sun 204 may have a distance 604 from the base 600 and the tree 206 may have a distance 606 from the base 600. FIG. 6b illustrates a mapping of the image 200 onto a plurality of lighting devices 612, 614, 616. The processor (not shown) may calculate a plurality of mappings, and determine one mapping wherein positions of the lighting devices 612, 614, 616 substantially correspond to the positions of the objects 202, 204, 206 in the image 200.

The 360 degree panoramic image may be a 360 degree panoramic video, and the light setting may be based on a video characteristic of the part of the 360 degree image. The 360 degree panoramic video is a sequence of 360 degree panoramic images. The processor 104 may control the plurality of lighting devices according to the sequence of 360 degree panoramic images over time, such that the light output of the plurality of lighting devices corresponds to the 360 degree panoramic video, according to any one of the above-mentioned ways/methods.

Figure 7:
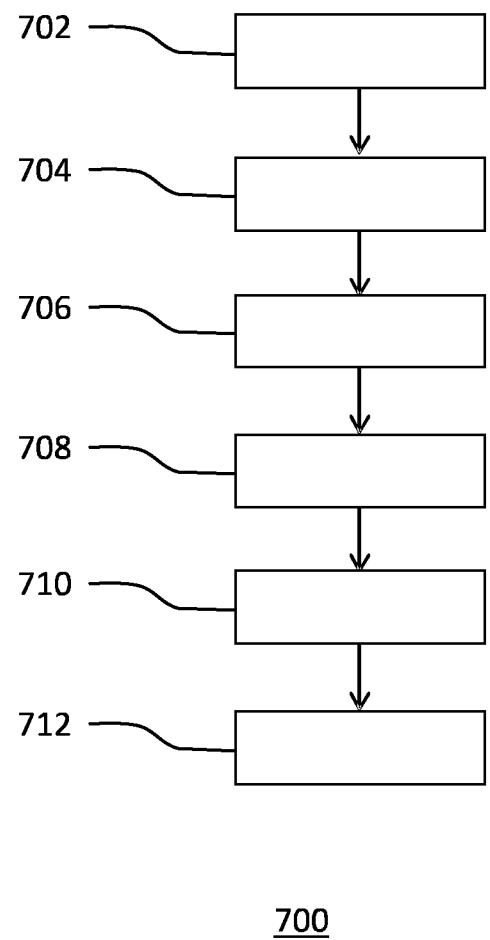
FIG. 7 shows schematically a method of controlling a plurality of lighting devices.

FIG. 7 shows schematically a method 700 of controlling a plurality of lighting devices 110, 112, 114. The method 700 comprises: obtaining 702 a 360 degree panoramic image, rendering 704 the 360 degree panoramic image at least partially on an image rendering device 120, obtaining 706 positions of the plurality of lighting devices relative to the image rendering device 120, mapping 708 the 360 degree panoramic image onto the plurality of lighting devices 110, 112, 114 based on the positions of the plurality of lighting devices 110, 112, 114, such that each lighting device is associated with a part of the 360 degree panoramic image, determining 710, for each lighting device, a light setting based on an image characteristic of the part of the 360 degree image and controlling 712 each lighting device according to the respective light setting.

The method 700 may be executed by computer program code of a computer program product when the computer program product is run on a processing unit of a computing device, such as the processor 104 of the controller 102.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet. A listing of the entire set of pending claims is submitted herewith per 37 CFR 1.121. This listing of claims will replace all prior versions, and listings, of claims in the application.

The invention claimed is:

1. A method of controlling a plurality of lighting devices, the method comprising:
    obtaining a 360 degree panoramic image,
    rendering the 360 degree panoramic image partially on an image rendering device,
    obtaining positions of the plurality of lighting devices relative to the image rendering device,
    mapping the 360 degree panoramic image onto the plurality of lighting devices based on the positions of the plurality of lighting devices relative to the image rendering device such that each lighting device is associated with a respective part of the 360 degree panoramic image,
    determining, for each lighting device, a light setting based on an image characteristic of the respective part of the 360 degree panoramic image, and
    controlling each lighting device according to the respective light setting, wherein the method further comprises receiving an input indicative of a rotation of the 360 degree panoramic image relative to the image rendering device, and adjusting the mapping of the 360 degree panoramic image onto the plurality of lighting devices in dependence on the rotation.

2. The method of claim 1, wherein the image rendering device is a portable device, and wherein the method further comprises:
    receiving an input indicative of a change of orientation of the image rendering device, and
    maintaining the mapping of the 360 degree panoramic image onto the plurality of lighting devices.

3. The method of claim 1, wherein the input is a user input received via a user interface.

4. The method of claim 1, further comprising:
    analyzing the 360 degree panoramic image to identify one or more dominant image characteristics, and
    identifying, in the 360 degree panoramic image, positions of the one or more dominant image characteristics, wherein the mapping of the 360 degree panoramic image onto the plurality of lighting devices and the image rendering device is further based on the positions of the one or more dominant image characteristics, wherein the positions of the one or more dominant image characteristics substantially correspond to the positions of one or more of the plurality of lighting devices.

5. The method of claim 1, further comprising:
    analyzing the part of the 360 degree panoramic image to identify a dominant image characteristic in the part of the 360 degree panoramic image, and
    determining the light setting for a respective lighting device based on the dominant image characteristic.

6. The method of claim 1, further comprising receiving a user position of a user or a user device, wherein the mapping of the 360 degree panoramic image onto the plurality of lighting devices is further based on the user position.

7. The method of claim 1, further comprising receiving a user orientation of a user or a user device, wherein the mapping of the 360 degree panoramic image onto the plurality of lighting devices is further based on the user orientation.

8. The method of claim 1, further comprising receiving capability information of each of the plurality of lighting devices, which capability information is indicative of at least one of:
    a color rendering capability of the respective lighting device, and
    a number and/or a distribution of light sources of the lighting device,
    wherein the mapping of the 360 degree panoramic image onto the plurality of lighting devices is further based on the capability information.

9. The method of claim 1, wherein the 360 degree panoramic image comprises depth information, and wherein the mapping of the 360 degree panoramic image onto the plurality of lighting devices is further based on the depth information.

10. The method of claim 1, further comprising:
    obtaining one or more positions of one or more further image rendering devices, wherein the mapping of the 360 degree panoramic image onto the plurality of lighting devices is further based on the one or more positions of one or more further image rendering devices.

11. The method of claim 1, wherein the 360 degree panoramic image is a 360 degree panoramic video, and wherein the light setting is based on a video characteristic of the part of the 360 degree panoramic image.

12. A non-transitory, computer readable medium having stored therein instructions comprising computer program code to perform, when the instructions are run on a processing unit of the computing device:
    obtaining a 360 degree panoramic image;
    rendering the 360 degree panoramic image partially on an image rendering device;
    obtaining positions of the plurality of lighting devices relative to the image rendering device;
    mapping the 360 degree panoramic image onto the plurality of lighting devices based on the positions of the plurality of lighting devices relative to the image rendering device such that each lighting device is associated with a respective part of the 360 degree panoramic image;
    determining, for each lighting device, a light setting based on an image characteristic of the respective part of the 360 degree panoramic image;
    controlling each lighting device according to the respective light setting, receiving an input indicative of a rotation of the 360 degree panoramic image relative to the image rendering device; and adjusting the mapping of the 360 degree panoramic image onto the plurality of lighting devices in dependence on the rotation.

13. The non-transitory, computer readable medium of claim 12, wherein, when the instructions are run on the processing unit of the computing device, the computer program code performs:

receiving an input indicative of a change of orientation of the image rendering device; and maintaining the mapping of the 360 degree panoramic image onto the plurality of lighting devices.

14. The non-transitory, computer readable medium of claim 12, wherein, when the instructions are run on the processing unit of the computing device, the computer program code performs:

analyzing the 360 degree panoramic image to identify one or more dominant image characteristics; and identifying, in the 360 degree panoramic image, positions of the one or more dominant image characteristics, wherein the mapping of the 360 degree panoramic image onto the plurality of lighting devices and the image rendering device is further based on the positions of the one or more dominant image characteristics, wherein the positions of the one or more dominant image characteristics substantially correspond to the positions of one or more of the plurality of lighting devices.

15. The computer program product of claim 12, wherein, when the computer program product is run on the processing unit of the computing device, the computer program code performs:

analyzing the part of the 360 degree panoramic image to identify a dominant image characteristic in the part of the 360 degree panoramic image; and determining the light setting for a respective lighting device based on the dominant image characteristic.

16. A controller for controlling a plurality of lighting devices, the controller comprising:

a communication unit configured to communicate with the plurality of lighting devices, and a processor configured to obtain a 360 degree panoramic image being partially rendered on an image rendering device, obtain positions of the plurality of lighting devices relative to the image rendering device, map the 360 degree panoramic image onto the plurality of lighting devices based on the positions of the plurality of lighting devices relative to the image rendering device such that each lighting device is associated with a respective part of the 360 degree panoramic image, determine, for each lighting device, a light setting based on an image characteristic of the respective part of the 360 degree panoramic image, and to control, via the communication unit, each lighting device according to the respective light setting, wherein the processor is further configured to receive an input indicative of a rotation of the 360 degree panoramic image relative to the image rendering device, and to adjust the mapping of the 360 degree panoramic image onto the plurality of lighting devices in dependence on the rotation.

17. The controller of claim 16, and wherein the controller is configured to send lighting control commands to a plurality of lighting devices that each comprise a receiver configured to receive the lighting control commands from the controller.

18. The controller of claim 16, wherein the controller is further configured to:

receive an input indicative of a change of orientation of the image rendering device; and maintain the mapping of the 360 degree panoramic image onto the plurality of lighting devices.

19. The controller of claim 16, wherein the controller is further configured to:

analyze the 360 degree panoramic image to identify one or more dominant image characteristics; and identify, in the 360 degree panoramic image, positions of the one or more dominant image characteristics, wherein the mapping of the 360 degree panoramic image onto the plurality of lighting devices and the image rendering device is further based on the positions of the one or more dominant image characteristics, wherein the positions of the one or more dominant image characteristics substantially correspond to the positions of one or more of the plurality of lighting devices.

20. The controller of claim 16, wherein the controller is further configured to:

analyze the part of the 360 degree panoramic image to identify a dominant image characteristic in the part of the 360 degree panoramic image; and determine the light setting for a respective lighting device based on the dominant image characteristic.

* * * * *